(12) United States Patent
Chrabieh et al.

(10) Patent No.: US 8,488,691 B2
(45) Date of Patent: Jul. 16, 2013

(54) ADAPTIVE LOADING FOR ORTHOGONAL FREQUENCY DIVISION MULTIPLEX (OFDM) COMMUNICATION SYSTEMS

(75) Inventors: Rabih Chrabieh, Paris (FR); Samir S. Soliman, San Diego, CA (US); Ozgur Dural, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1032 days.

(21) Appl. No.: 12/266,842

(22) Filed: Nov. 7, 2008

(65) Prior Publication Data

US 2010/0086066 A1    Apr. 8, 2010

Related U.S. Application Data

(60) Provisional application No. 61/103,762, filed on Oct. 8, 2008.

(51) Int. Cl.
   *H04L 27/28* (2006.01)
(52) U.S. Cl.
   USPC .......................................... 375/260; 375/295
(58) Field of Classification Search
   USPC .......................................... 375/295, 360, 260
   See application file for complete search history.

(56) References Cited

U.S. PATENT DOCUMENTS

| | | | |
|---|---|---|---|
| 5,291,289 A * | 3/1994 | Hulyalkar et al. | 348/723 |
| 5,852,630 A * | 12/1998 | Langberg et al. | 375/219 |
| 2003/0003880 A1 * | 1/2003 | Ling et al. | 455/92 |
| 2004/0174808 A1 | 9/2004 | Bolinth et al. | |
| 2005/0032514 A1 * | 2/2005 | Sadri et al. | 455/423 |
| 2005/0157670 A1 | 7/2005 | Tang et al. | |
| 2007/0263737 A1 * | 11/2007 | Li et al. | 375/260 |
| 2008/0056181 A1 | 3/2008 | Imamura et al. | |
| 2008/0084939 A1 * | 4/2008 | Locke | 375/260 |
| 2008/0316959 A1 * | 12/2008 | Bachl et al. | 370/329 |

FOREIGN PATENT DOCUMENTS

| | | |
|---|---|---|
| EP | 1187413 A1 | 3/2002 |
| EP | 1895732 A1 | 3/2008 |
| JP | 2003509786 A | 3/2003 |
| JP | 2005295200 A | 10/2005 |
| WO | 0120864 A1 | 3/2001 |
| WO | 2006030867 A1 | 3/2006 |

OTHER PUBLICATIONS

Wyglinski, Alexander M., et al. Bit Loading with BER-Constraint for Multicarrier Systems, IEEE Transactions on Wireless Communications, vol. 4, No. 4, Jul. 2005, pp. 1383-1387.

Grunheid, Rainer, et al. A Blockwise Loading Algorithm for the Adaptive Modulation Technique in OFDM Systems, IEEE 2001, pp. 948-951.

(Continued)

*Primary Examiner* — Kabir A Timory
*Assistant Examiner* — David Huang
(74) *Attorney, Agent, or Firm* — QUALCOMM Patent Group; James Hunt Yancey, Jr.

(57) ABSTRACT

An orthogonal frequency division multiplex (OFDM) transmitter may adaptively load each sub-carrier, buffering less than an OFDM frame in order to reduce hardware requirements and latency. The transmitter may use feedback information from the receiver regarding the quality of the sub-carriers. In addition, combining repetition and puncturing to achieve a desired date rate per class further reduces hardware by simplifying or even eliminating an interleaver. Additional mitigation and even performance enhancement techniques are incorporated to address inter-class boundaries within an OFDM frame, such as introducing transition classes. Channel state information may be reported in various formats including full bitmap, changed subchannels, and reported bad subchannels.

24 Claims, 7 Drawing Sheets

OTHER PUBLICATIONS

International Search Report and Written Opinion—PCT/US2009/060060—ISA/EPO—Mar. 2, 2010.

Fujie, Translation of Office Action Provided by JP Counsel, Mailed Apr. 9, 2013, pp. 1-4.

* cited by examiner

ADAPTIVE LOADING FOR ORTHOGONAL FREQUENCY DIVISION MULTIPLEX (OFDM) COMMUNICATION SYSTEMS

CLAIM OF PRIORITY UNDER 35 U.S.C. §119

The present application for patent claims priority to Provisional Application Ser. No. 61/103,762, entitled "Adaptive Loading for Orthogonal Frequency Division Multiplex (OFDM) Communication Systems," filed Oct. 8, 2008, assigned to the assignee hereof and hereby expressly incorporated by reference herein.

FIELD OF INVENTION

The present description relates generally to data communications, and more specifically to techniques for adaptive loading in an orthogonal frequency division multiplexing (OFDM) communication system.

BACKGROUND

Wireless communication systems employ various types of modulation schemes. Typically, a modulation scheme may be selected based upon the requirements of the particular system. Orthogonal Frequency Division Multiplex (OFDM) is a modulation scheme that has a primary advantage over single-carrier schemes in that it has an ability to cope with severe channel conditions.

In an OFDM system, the system bandwidth is effectively partitioned into a number ($N_F$) of frequency subchannels that may be referred to as sub-bands, sub-carriers, or frequency bins. Each frequency subchannel is associated with a respective frequency tone. Typically, the transmitted data is encoded with a particular coding scheme to generate encoded bits. The encoded bits may be further grouped into multi-bit symbols that are mapped to modulation symbols based on a particular modulation scheme (e.g., M-PSK or M-QAM). The serial data comprising the mapped modulation symbols are then turned into parallel data symbols with a specific time duration. These parallel data symbols are transformed by an Inverse Fast Fourier Transform (IFFT), which in turn generates the modulation of the data onto the various sub-carriers. The data transmitted on the sub-carriers for each time interval is commonly called an OFDM symbol. Thus, information is transmitted on more than one carrier, which in turn provides frequency diversity and adds robustness.

Nevertheless, each frequency subchannel of an OFDM system may experience different channel conditions (e.g., different fading and multipath effects) and signal-to-noise-and-interference ratios (SNIRs). Thus, the modulation symbols that collectively form a particular data packet may be individually received with different SNIR values. As a result, the supported data rates for the frequency subchannels may also vary over time. Thus, it may be inefficient to transmit data at the same data rate and/or transmit power for all of the given subchannels. In conjunction, it may be challenging to effectively code and modulate data efficiently for an adaptive loading OFDM system, because of the dynamic transmission parameters. A system that utilizes fixed transmission parameters in some aspects may be simpler to code and modulate, but may be more susceptible to inefficient transmission. Such a system may be Ultra Wide-Band (UWB).

UWB typically transmits each sub-carrier equally loaded with no carrier quality knowledge at the transmitter. Essentially, UWB keeps the average data rate constant. Diversity, and hence interleaving, becomes more important in UWB in order to reduce the chances of losing an information bit. However, equally loading the sub-carriers under-utilizes high quality sub-carriers and may require medium access channel (MAC) mitigation of data losses due to time varying changes in channel conditions.

Therefore, there is a need in the art to provide solutions to the above identified problems.

SUMMARY

The following simplified summary provides a basic understanding of some parts of the disclosed aspects and is intended to neither identify key or critical elements nor delineate the scope of such aspects. Its purpose is to present some concepts of the described features in a simplified form as a prelude to the more detailed description that is presented later. The various aspects disclosed herein are directed to a method and an apparatus for adaptive loading in an orthogonal frequency division multiplexing (OFDM) communication system.

In some aspects, a method is provided in which sub-carriers are grouped into at least one of a plurality of classes. The grouping is based upon feedback and each class has an associated data rate. Encoded data bits, sized less than an OFDM frame, are de-multiplexed in order to correspond to the classes. The encoded data bits are rate adapted in order to correspond to the class' associated data rate. The rate adapted data bits are buffered according to the classes, and each class has an associated buffer. Finally, the buffered data is mapped onto the corresponding group of sub-carriers for data transmission.

In yet another aspect, a method is provided in which received OFDM symbols are de-mapped in order to produce rate adapted bits from at least one of a plurality of sub-carriers; each sub-carrier has an associated class and each class has an associated data rate. The sub-carriers are grouped into at least one of a plurality of classes, and the grouping is based upon channel state information. Then rate adapted data bits are buffered according to the classes, and each class has an associated buffer. Finally, in order to produce encoded data bits, the buffered rate adapted data bits are multiplexed; the multiplexing comprises rate adapting the rate adapted data bits, sized less than an OFDM frame, corresponding to their classes.

In an aspect, an apparatus is provided in which there are means for grouping sub-carriers into at least one of a plurality of classes and the grouping is based upon feedback and each class has an associated data rate. There are means for de-multiplexing encoded data bits, sized less than an OFDM frame, to correspond to the at least one of a plurality of classes and the encoded data bits are rate adapted in order to correspond to the class' associated data rate. There are means for buffering the rate adapted data bits according to the at least one of a plurality of classes and each class has an associated buffer. Finally, there are means for mapping the buffered data onto the corresponding group of sub-carriers for data transmission.

In yet another aspect, an apparatus is provided in which there are means for de-mapping a received OFDM symbol from at least one of a plurality of sub-carriers in order to produce rate adapted bits, and each sub-carrier has an associated at least one of a plurality of classes. There are means for grouping the at least one of a plurality of sub-carriers into at least one of a plurality of classes; the grouping is based upon channel state information and each class has an associated data rate. There are means for buffering the rate adapted data bits according to the at least one of a plurality of classes, and each class has an associated buffer. Finally, there are means for multiplexing the rate adapted bits, sized less than an OFDM frame, corresponding to the at least one of a plurality of classes; the rate adapted data bits are rate adapted in order to produce encoded data bits.

In some aspects, an apparatus is provided in which a grouping module is configured to group sub-carriers into at least one of a plurality of classes. The grouping is based upon feedback, and each class has an associated data rate. A de-multiplexing module is configured to de-multiplex encoded data bits, sized less than an OFDM frame, to correspond to the at least one of a plurality of classes, and the encoded data bits are rate adapted in order to correspond to the class' associated data rate. A buffering module is configured to buffer the rate adapted data bits according to the at least one of a plurality of classes; each class has an associated buffer. Finally, a mapper module is configured to map the buffered data onto the corresponding group of sub-carriers for data transmission.

In yet another aspect, an apparatus is provided in which a de-mapping module is configured to de-map a received OFDM symbol from at least one of a plurality of sub-carriers in order to produce rate adapted bits, and each sub-carrier has an associated at least one of a plurality of classes. A grouping module is configured to group the at least one of a plurality of sub-carriers into at least one of a plurality of classes. The grouping is based upon channel state information, and each class has an associated data rate. A buffering module is configured to buffer the rate adapted data bits according to the at least one of a plurality of classes; each class has an associated buffer. Finally, a multiplexing module is configured to multiplex the rate adapted bits, sized less than an OFDM frame, corresponding to the at least one of a plurality of classes; the rate adapted data bits are rate adapted in order to produce encoded data bits.

In another aspect computer program product is provided in which a computer-readable medium comprises code for causing a computer to group sub-carriers into at least one of a plurality of classes. The grouping is based upon feedback, and each class has an associated data rate. To de-multiplex encoded data bits, sized less than an OFDM frame, to correspond to the at least one of a plurality of classes. The encoded data bits are rate adapted in order to correspond to the class' associated data rate. To buffer the rate adapted data bits according to the at least one of a plurality of classes; each class has an associated buffer. Finally, to map the buffered data onto the corresponding group of sub-carriers for data transmission.

In yet an aspect, a computer program product is provided in which a computer-readable medium comprises code for causing a computer to de-map a received OFDM symbol from at least one of a plurality of sub-carriers in order to produce rate adapted bits, and each sub-carrier has an associated at least one of a plurality of classes. To group the at least one of a plurality of sub-carriers into at least one of a plurality of classes. The grouping is based upon channel state information, and each class has an associated data rate. To buffer the rate adapted data bits according to the at least one of a plurality of classes; each class has an associated buffer. Finally, to multiplex the rate adapted bits, sized less than an OFDM frame, corresponding to the at least one of a plurality of classes, wherein the rate adapted data bits are rate adapted in order to produce encoded data bits.

In some aspects, an integrated circuit is provided in which a processor is operable to group sub-carriers into at least one of a plurality of classes. The grouping is based upon feedback and each class has an associated data rate. The processor is operable to receive feedback, and de-multiplex encoded data bits, sized less than an OFDM frame, to correspond to the at least one of a plurality of classes. The encoded data bits are rate adapted in order to correspond to the class' associated data rate. Is operable to buffer the rate adapted data bits according to the at least one of a plurality of classes; each class has an associated buffer. Is operable to map the buffered data onto the corresponding group of sub-carriers for data transmission. The processor also has memory associated with it.

In yet another aspect, an integrated circuit is provided in which a processor is operable to de-map a received OFDM symbol from at least one of a plurality of sub-carriers in order to produce rate adapted bits. Each sub-carrier has an associated at least one of a plurality of classes. Is operable to group the at least one of a plurality of sub-carriers into at least one of a plurality of classes. The grouping is based upon channel state information and each class has an associated data rate. The processor is operable to buffer the rate adapted data bits according to the at least one of a plurality of classes; each class has an associated buffer. Is operable to multiplex the rate adapted bits, sized less than an OFDM frame, corresponding to the at least one of a plurality of classes. The rate adapted data bits are rate adapted in order to produce encoded data bits. Finally, the processor is operable to transmit a channel state information (CSI) report. The processor also has memory associated with it.

DETAILED DESCRIPTION

Various aspects of the disclosure are described below. Any aspect described herein as "exemplary" is not necessarily to be construed as preferred or advantageous over other aspects. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The various aspects disclose a method and an apparatus for adaptive loading in an orthogonal frequency division multiplexing (OFDM) communication system in order to solve the various problems stated above. The features, nature, and advantages of the present disclosure will become more apparent from the detailed description set forth below when taken in conjunction with the drawings.

Figure 1:
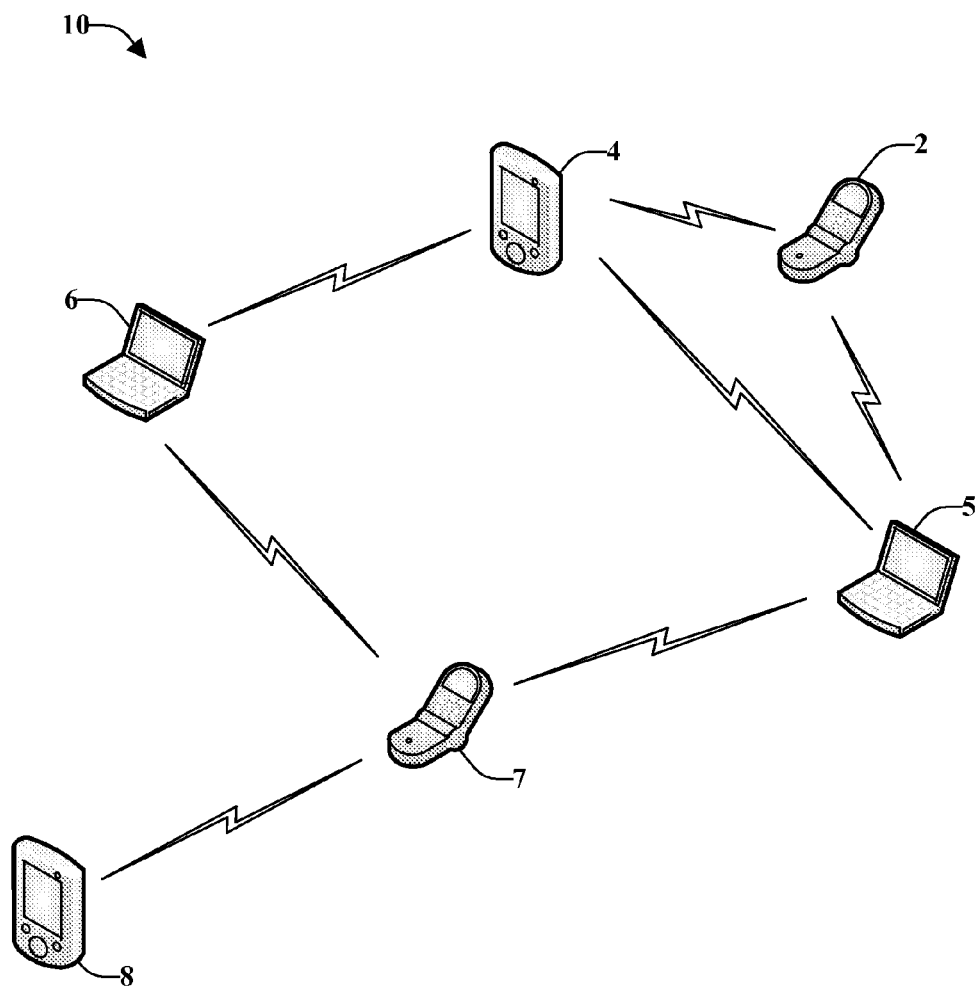
FIG. 1 illustrates a basic diagram of a wireless communication system that may be used to operate the various aspects disclosed.

FIG. 1 illustrates a basic diagram of a wireless communication system 10 that may be used to operate the various aspects disclosed. The wireless communication system 10 may be an ad hoc wireless communication network and may support peer-to-peer communications. During peer-to-peer communication, nodes, devices, terminals or stations may communicate directly with each other, as opposed to using base stations, access points, and/or access routers to relay or forward communications. In some such networks, devices within the network may relay or forward traffic destined to other devices. Some ad hoc networks may include both terminals and access points.

Network 10 may include any number of mobile devices or nodes, of which six are illustrated, that support wireless communication. Mobile devices may be, for example, cellular phones, smart phones, laptops, handheld communication devices, handheld computing devices, satellite radios, global positioning systems, PDAs, and/or any other suitable device for communicating over wireless communication system 10. Nodes, as used herein, include mobile devices, access points, base stations, access routers, or the like.

Figure 2:
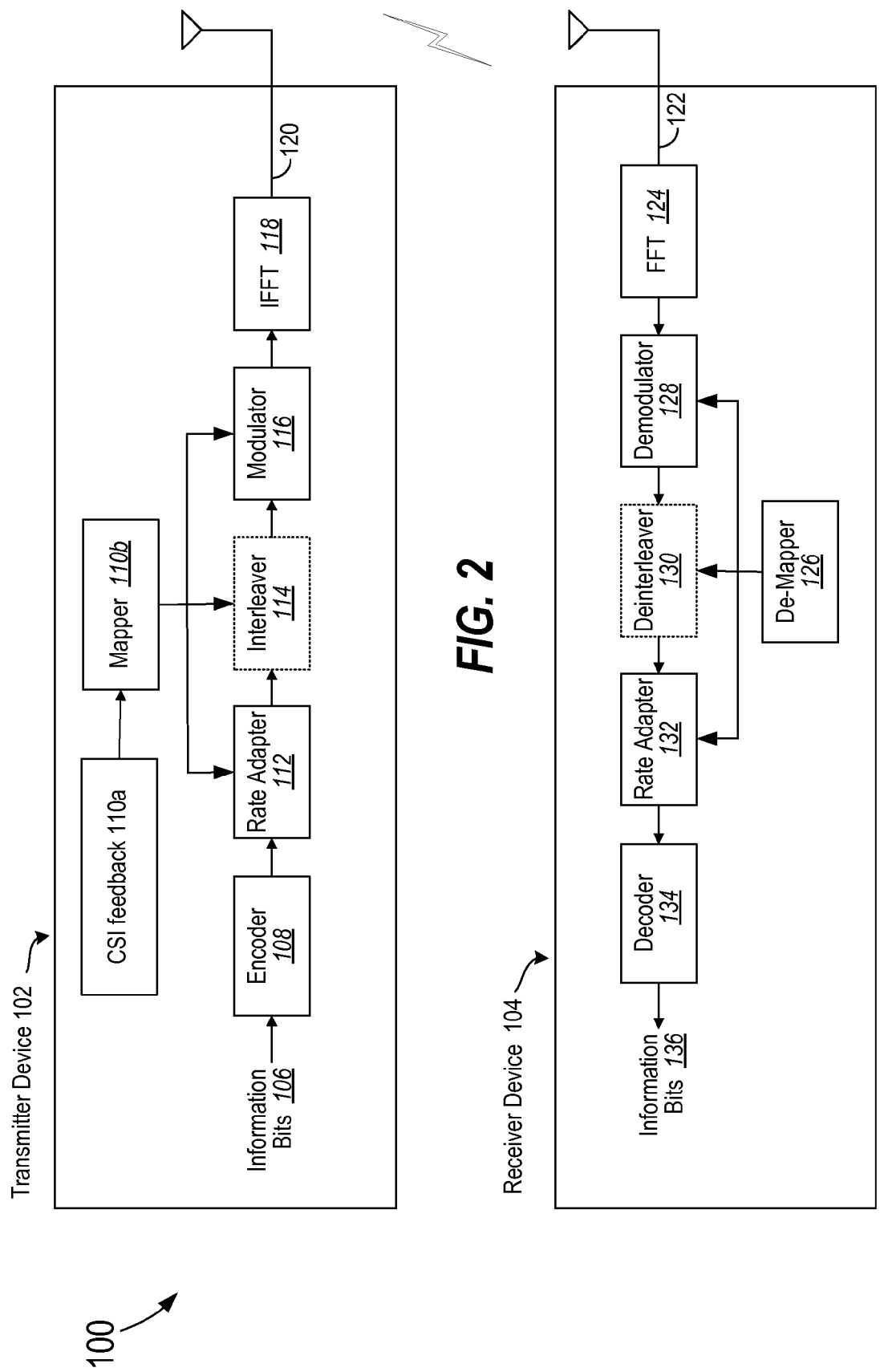
FIG. 2 illustrates a simplified block diagram of a transmitter and receiver that may be used to operate the various aspects disclosed.

Nodes 2, 4, 5, 6, 7, and 8 are illustrated as configured in a peer-to-peer ad hoc topology. Each node may be within range of one or more other nodes and may communicate with the other nodes or through utilization of the other nodes, such as in a multi-hop topology (e.g. communications may hop from node to node until reaching a final destination). For example, a sender node 2 may wish to communicate with receiver node 8. To enable packet transfer between sender node 2 and receiver node 8, one or more intermediate nodes 4, 6, 5, and 7 may be utilized. It should be understood that any node 2-8 may be a sender node and/or a receiver node and may perform functions of either sending or receiving information at substantially the same time (e.g., may broadcast or communicate information at about the same time as receiving information). It should also be understood that any node 2-8 could also provide access to other communications infrastructure, such as a wired network (not shown), and in some cases may function similar to an access point. A node may utilize one or more antennas. The multiple access wireless communication system 10 may utilize OFDM. FIG. 2 illustrates a simplified block diagram of a wireless communication system 10 that comprises a transmitter and receiver that may be used to operate the various aspects disclosed.

In an aspect, FIG. 2 shows a communication system 100 that may utilize OFDM-based UWB and perform adaptive loading and other performance enhancements. The communication system 100, for simplicity shows only one transmitter device 102 and receiver device 104. However, typically multiple transmitter devices and receiver devices are part of a communication system. Moreover, a single communication device (e.g., a cell phone or laptop) may comprise both the functionality of the transmitter device 102 as well as the receiver device 104. In order to perform adaptive loading, first the sub-carriers are grouped into classes $C_i$ of quality levels. The sub-carriers may be grouped based on feedback from the receiver device 104. For example, the receiver device 104 may send channel state information (CSI) to the transmitter 102. Once the sub-carriers are grouped into classes, a constant optimal data rate $R_i$ is then associated with the classes. Information bits may first be encoded then rate adapted $R_i$, modulated, and finally transmitted on the characterized sub-carriers according to their class $C_i$.

In an aspect of the design, information bits 106 are sent to a baseline encoder 108. The information bits may be partitioned into packets or frames, and each packet may be individually processed and transmitted. The coding performed by the encoder 108 increases the reliability of the data transmission. The coding scheme encoder 108 may utilize may be any combination of CRC (cyclic redundancy check) coding, convolutional coding, Turbo coding, block coding, other coding, or no coding at all. In an aspect of the design, for each packet, the data in the packet may be used to generate a set of CRC bits, which may be appended to the data. The data and CRC bits may then be coded with a rate ⅓ convolutional code or a Turbo code to generate the encoded data for the packet. Once encoded, the encoded bits are then sent to a rate adapter 112.

A mapper 110b may get CSI feedback information from 110a. The mapper 110b uses the CSI feedback information to generate the mapping between subcarriers and classes (buffers). The rate adapter 112 will change the encoded bits data rate to match the sub-carrier class' data rates. For example, one class $C_7$ may comprise strong carriers and have a data rate of $R_7$. In this example, the rate adapter will change the encoded data bits rate to be $R_7$. Moreover, a class $C_0$ may comprise weak carriers and have a data rate of $R_0$. For this class, the rate adapter would then change the encoded data bits rate to be $R_0$. In order to accomplish this, the rate adapter 112 may utilize puncturing or repetition.

In an aspect of the design, the rate adapter 112 first uses repetition on the encoded bits then applies puncturing. This pattern may provide some system gain in that adjacent sub-carriers may be less affecting by a center band fade. There may be any number of levels of classes defined by the system. In an aspect of the design, eight (8) classes are defined. The rate adapter 112 may eliminate the need for an interleaver 114. However, header information may still need to be interleaved. Thus, in an aspect of the design a header may be transmitted at a fixed 53.3 Mbps with some interleaving provided by the optional interleaver 114. This may allow a reduction in size of the interleaver 114 to perhaps one (1) to three (3) OFDM symbols (i.e., 200-600 bits) without having to do frequency or time spreading but rather a simple repetition of four (4). The rate adapter 112 may be part of a de-multiplexer wherein the encoded bits are MUXed to the various subchannel classes. The de-multiplexer may also include a buffer, or several buffers, that correspond to the classes $C_i$ in order to hold the rate adapted bits for a mapper 110b to map them onto a corresponding subchannel. The buffer or buffers may also be separate from the de-multiplexer. In an aspect of the design, for each class $C_i$, a class buffer of coded bits may be maintained. Thus, a rate adapter 112 using repetition or puncturing may fill up the class buffer. The mapper 110b may empty the buffer. When the class buffer is empty, more bits may be requested. The operation may be entirely deterministic in that a receiver is able to reproduce the exact same pattern as the transmitter at the receiver. Therefore, a prediction may be made as to sizes of data chunks being sent.

Once the data is rate adapted and/or interleaved, it may be passed on to a modulator 116. The rate adapted bits may be modulated by the modulator 116. One or more modulation schemes may be used for the frequency subchannels, as indicated by the modulation control. For each modulation scheme selected for use, the modulation may be achieved by grouping sets of received bits to form multi-bit symbols and mapping each multi-bit symbol to a point in a signal constellation corresponding to the selected modulation scheme (e.g., QPSK, M-PSK, M-QAM, or some other scheme). The mapper 110b will map the symbols from each class onto the corresponding sub-carriers.

The mapper 110b may be dynamic in nature, because the sub-carriers may change classes based on varying channel conditions. The mapper 110b may be implemented in various ways. In an aspect of the design, the mapper 110b may be implemented as a dynamic look up table residing in a random access memory (RAM). Each mapped signal point corresponds to a modulation symbol. Symbol mapping may provide a vector of (up to $N_F$) modulation symbols for each transmission symbol period. The number of modulation symbols in each vector corresponds to the number of (up to $N_F$) frequency subchannels selected for use for that transmission symbol period. The mapper 110b maps the modulated symbols onto the corresponding sub-carriers via an IFFT 118, and transmits them via a local transmitter and antenna 120. Only one transmitting and receiving antenna are shown, but more than one antenna can be used for transmission and reception (e.g., MIMO or SIMO). The OFDM transmission is received over-the-air (OTA) at the receiver device 104 by a local receiver and antenna 122.

The receiver device 104 performs a complimentary process to that of the transmitter device 102. A de-mapper 126 passes the received information through a Fast Fourier Transform (FFT) 124 in order to obtain modulation symbols from the sub-carriers. The de-mapper further controls the receiving processes, specifically a demodulator 128, a deinterleaver 130, and a rate adapter 132. In an aspect of the design, the rate adapter 132 concatenates the various data rates, as well as removing puncturing and repetition that were used to achieve the desired data rate. Then the results pass through a baseline decoder 134 to reproduce information bits 136. At the receiver device 104, the same logic may be used to read the appropriate buffer (class) in the appropriate order. The ordering may appear to be semi-random due to the difference in the amount of tones belonging to each class; however, it is possible to determine the reproducible order. In an aspect of the design, a method may include counting the number of tones per one (1) or two (2) OFDM symbols needed per class, and filling up that class with the amount of bits needed. In the case where a class remains partially unfilled in the last OFDM symbol, it is merged with a lower quality class. Then the classes are processed by a determined sorting order.

Figure 3:
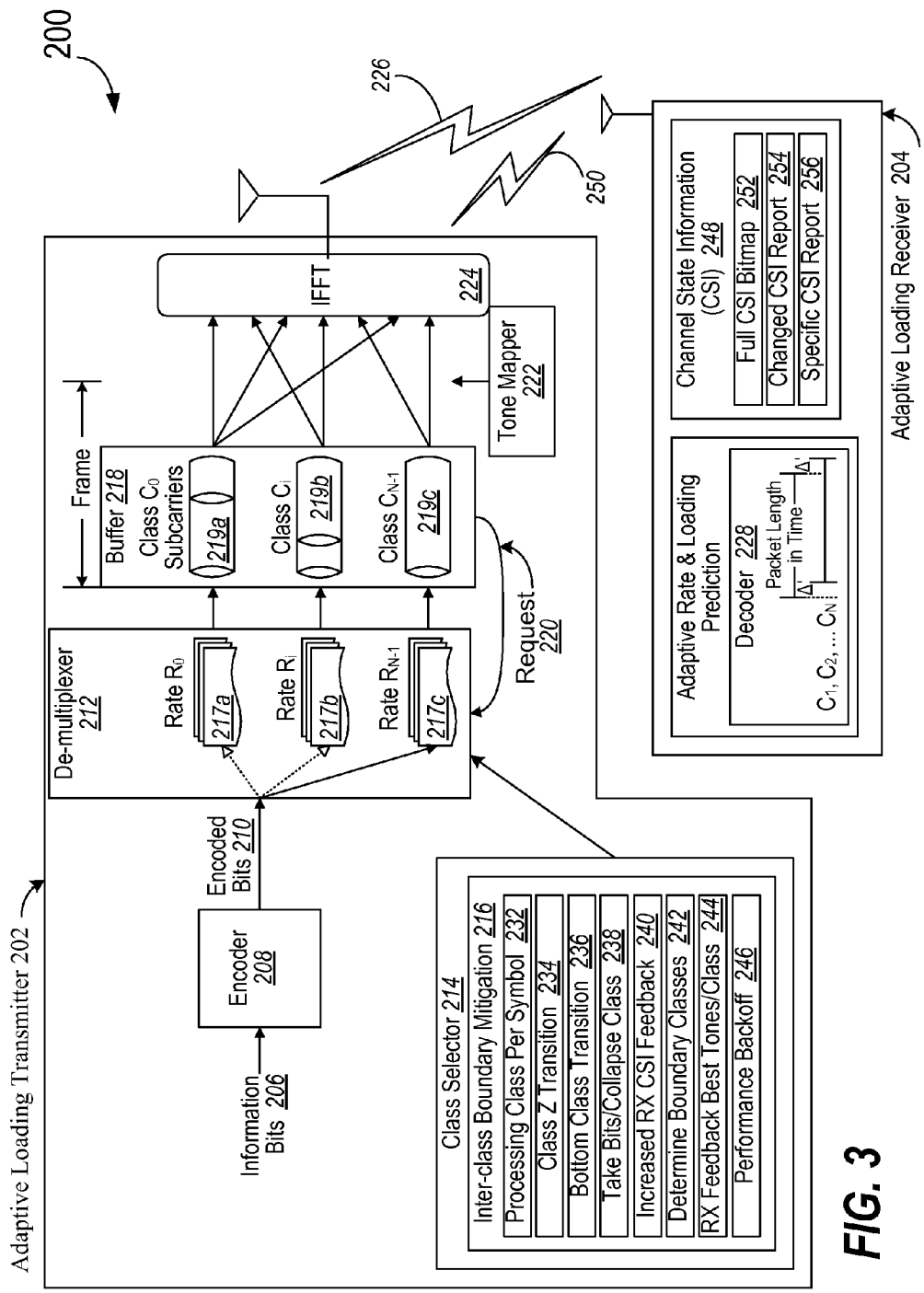
FIG. 3 illustrates a more detailed block diagram of a transmitter and receiver that may be used to operate the various aspects disclosed.

In an aspect of the design, both the transmitter device 102 and the receiver device 104 may have the same quality class knowledge. Hence, it may be sufficient to apply the same algorithm at transmitter device 102 and receiver device 104 in order to properly MUX/deMUX bits between encoded coded stream and classes, and to properly map/unmap bits between classes and sub-carriers. At the receiver device 104, the coded stream may incur un-puncturing or un-repetition before it goes into a decoder 134. Un-puncturing means that the absent metric is replaced by value zero (0). Un-repetition means to accumulate repeated metrics. A number of performance enhancements may mitigate or enhance the communication system 100 beyond any performance detriments that may be introduced by the simplified hardware architecture. FIG. 3 helps illustrate aspects of the design that incorporates some of these techniques.

FIG. 3 illustrates a more detailed block diagram of a communication system 200 that comprises a transmitter and receiver that may be used to operate the various aspects disclosed. Communication system 200 performs OFDM transmission between an adaptive loading transmitter 202 and receiver 204. Adaptive loading may cause a mixing of different rate codes. The classes and corresponding rates may be based on the Signal to Noise and Interference Ratio (SINR) that may be measured at the adaptive loading receiver 204. Each class is characterized by a constant data rate $R_i$. The data rate may be tuned to the corresponding SINR. In an aspect, the information bits 206 are data processed by a one third (⅓) rate convolutional encoder 208 to produce encoded bits 210. However, the encoder 208 could use other rates and other types of encoding schemes. The encoded bits 210 pass to a de-multiplexer (MUX) 212 for data processing to achieve a desired data rate in accordance with a class selector 214, which advantageously may impose boundary mitigation 216.

The de-multiplexer 212 feeds encoded bits 210 to a plurality of rate adapting elements 217a-217c that produce the assigned data rate. In an aspect of the design, the repetition and puncturing patterns produced by the rate adapting elements 217a-217c are relatively similar in order to avoid significant performance degradation due to the boundaries between classes. The channel conditions vary and so the rate for channels may vary. As a result, the class selector 214 may direct the de-multiplexer 212, for example, to start at a ⅓ rate code, then jump to a ½ rate code, then to a ⅝ rate code, then back again to a ⅓ rate code.

The rate adapted bits are then moved from the rate adapting elements 217a-217c into class buffers of buffer 218. In an aspect of the design, buffer 218 may be one buffer that is partitioned into smaller buffers 219a-219c, which may be less expensive than having one buffer per class. The buffer 218 may also comprise several individual discreet buffers. In an aspect of the design, buffer 218 is depicted as a unitary memory component segregated into the plurality of class buffers $\{C_0, C_i, \ldots, C_{N-1}\}$ 219a-219c. Each buffer 219a-219c is sized less than an OFDM frame. Each class owns a section in the buffer with dynamic size. The more tones in the class, the larger the buffer size.

In one aspect of the design, all classes have a size that is a multiple of the puncturing patterns. Each class buffer may be filled and then the next class buffer may be filled. At the adaptive loading receiver 204, the opposite function may be performed and the receiving class buffers must be full before being read sequentially by a de-mapper. If it is difficult or undesirable to make the size of the classes multiple puncturing patterns, then additional techniques may be employed. For example, some extra tones may be dropped to the lower classes until multiples are achieved. Alternatively, additional small pre-buffering may be employed for particularly demanding classes.

When a class buffer 219a-c is empty, a request 220 from buffer 218 or from the tone mapper 222 may be made for the de-multiplexer 212 to provide more bits. The tone mapper 222 maps the class buffers 219a-219c of buffer 218 to an Inverse Fast Fourier Transform IFFT 224 for output as an OFDM OTA transmission (TX) 226 to be received by the adaptive loading receiver 204. The transmission 226 may be transmitted as a concatenated class of OFDM symbols that may result in a packet length in time in order to avoid decoder delays.

At the adaptive loading receiver 204 a decoder 228 anticipates the adaptive loading by determinatively employing an algorithm similar to that used by the adaptive loading transmitter 202 in that it has the benefit of the same CSI. With regard to the medium access control (MAC) layer, the MAC may handle a continuous set of possible data rates while the physical (PHY) layer may calculate the average data rate at a given instant in time and submit this information to the MAC.

For OFDM modulation with a large number of sub-carriers, such as Ultra-Wide Band (UWB), savings in device complexity, size, power consumption and cost may be significantly made by scaling back hardware requirements from a full frame buffer. However, the introduction of inter-class boundaries during modulation may inflict performance degradation, especially when targeting an operation close to throughput mean performance.

It should be appreciated, with the benefit of the present disclosure, that the class distribution and buffer size per class might be readily calculated, especially in UWB where the power per tone is constant. Alternatively, generally known algorithms may be employed for class distributions and sizes, especially for applications in which the power may change.

As discussed below, a number of performance enhancements may mitigate or enhance the communication system 200 beyond any performance detriments that may be introduced by the simplified hardware architecture. In aspects of the design, the inter-class boundary mitigation techniques 216 include:

a technique 232 for processing an entire class per symbol technique,
a technique 234 for using a highest quality class "Z" as a transition class,
a technique 236 for use of a bottom class as a transition class,
a technique 238 for taking bits from another class when needed for additional transitions and collapsing the remainder into a lower class,
a technique 240 for increasing receiver (RX) CSI feedback,
a technique 242 for determining boundary classes,
a technique 244 for employing receiver (RX) feedback as to the best tones for a class prior to quantization for use at transitions, and
a technique 246 for performance back off to mitigate inter-class boundary effects.

Inter-Class Boundary Mitigation

Inter-class boundary occurs when less than an entire OFDM frame is buffered. For example, say there are a total of eight (8) classes defined in the communication system 200 numbered 0-7, and that the lowest class 0 has poorer SINR associated with it than the other classes and class 7 has the higher SINR. In an aspect of the design, the SINR steps between the classes may be 2 or 3 dB steps. To have an entire frame buffered, for example, all of a class must be encoded and then the encoded bits must be mapped onto all the sub-carriers of all the OFDM symbols. Next, it is necessary to proceed to the next class, and so on. In other words, one code rate is processed at a time. However, for hardware reduction purposes, it may be necessary to avoid any buffering or to limit the size of the buffering. When the buffer size is limited data from more than one class may be mapped to an OFDM symbol, which results in boundaries between classes. Boundaries between classes are generally avoided because the codes are not optimized for sudden changes in data rate. As an example of changing data rates, the input of the decoder 228 may be a block at rate $3/4$, followed by a block at rate $1/12$, and then followed by a block at rate $2/3$. In an aspect of the design, the decoder 228 is a Viterbi decoder.

If boundary reduction is necessary, an entire class may be processed using the technique of processing the class per symbol 232, which is used for processing an entire class per OFDM symbol before moving onto the next class. In an aspect of the design, this may be accomplished by proceeding in reverse order of the classes for the following OFDM symbol:

(1) First OFDM symbol:
  (a) Class 0 (process it entirely);
  (b) Class 1;
  (c) ...
  (d) Class 7
(2) Second OFDM symbol:
  (a) Class 7 (restart from last class of previous symbol to minimize boundaries);
  (b) ...
  (c) Class 1
  (d) Class 0
  etc.

Boundaries may be further reduced by simply increasing the size of the class buffers. Two (2) or three (3) OFDM symbols worth of rate adapted bits may be buffered for each class. A class buffer may be filled before moving onto the next class. Part of the buffer may be carried on to the next OFDM symbol.

In some instances, boundaries may actually play a beneficial role. For example, since class 7 may contain very strong sub-carriers, it may be desirable to interleave class 7 with weaker classes to give them a boost. Likewise, interleaving class 0 with other classes reduces its weakness. Interleaving of classes may be simply achieved by having a short buffer and by scheduling the multiplexing: e.g., class 0 comes after class 7 if it has bits available.

In an aspect of the design, a reduction in the degradation in performance, perhaps even a gain in performance, may be accomplished through the use of the technique class Z transition 234. The class Z transition uses the highest quality class as a transition class. In particular, a short transition class Z may be inserted between classes. For example, there may be a transition state between class 5 and class 3. Class Z, being the highest quality class, may contain very high quality tones. However, because the tones are grouped into a limited amount of classes (e.g. quantization and saturation), all of these great quality tones may end up in a unique class Z. It should be appreciated that, with the benefit of the present disclosure, there would not be saturation when 1024 QAM is used, but anything above 64 QAM, for example, will have to be saturated to 64 QAM. Consequently, class Z may often contain excellent quality tones that, once inserted between class 5 and 3, may more than compensate for the loss in performance due to inter-class boundaries. In an aspect of the design, class Z has a total of seven (7) bits, and may cover transitions between eight (8) classes.

In another aspect of the design, the technique of bottom class transition 236 may be used. The transition class in this instance may be the bottom class or one of the classes that uses heavy repetition. The classes that use heavy repetition may be well suited for transitions, because they may not suffer as much from puncturing issues.

In yet another aspect, the technique of take bits/collapse class 238 may be used. In this aspect, if there are not enough transition bits then some bits may be chosen from some classes and collapsed onto the lower class. Although a small loss of throughput may be observed, these bits may have excellent quality and may be used for transition.

Another aspect of the design may be to use the technique of increased RX CSI feedback 240. Increased RX CSI feedback 240 adds more feedback information from the RX to the TX. The RX may, after quantizing the tone's quality into classes, check which of the tones happen to fall near the top edge of their class (almost falling into the upper class). These tones may have, for example, one (1) or two (2) dB better performance than the class average. Those special bits may then be used for transitions. The RX feeds back to TX the location of those tones, which often happen to be adjacent so the amount of OTA resources consumed for such feedback may be small.

In another aspect of the design, the technique of determine boundary classes 242 may be used. In this technique classes are selected that may intersect conveniently with each other, mindful that a class may terminate at different puncturing states. For each termination state, a next best class may be selected.

In yet another aspect of the design, the technique of RX feedback best tones/class 244 may be used. In this technique, the adaptive loading receiver 204 remembers, per class, the best tone before quantization. The adaptive loading transmitter 202 is informed of the next best tone, such as utilizing a specific CSI report 256. Then, the adaptive loading transmitter 202 uses this best tone per class as the first tone to start with in the class. Thereby, the boundary between classes may be improved due to additional power at the boundaries. The increased performance may outweigh the impact of requiring more CSI feedback.

In another aspect, the technique of performance backoff 246 may be used. Performance backoff causes a back off throughput performance to obviate boundary degradation. This back off may simply be accomplished through the use of the minimum level in each class rather than the mean. In this instance, there may be no boundary between classes and no interleaving may be needed either. The performance backoff technique 246 may be very simple and inexpensive to implement.

With regard to robustness, adaptive loading may push the limit of the system to the edge. Therefore, the system may be less robust to sudden changes in the RF environment. The use of additional link margin may increase robustness. Alternatively, quick feedback and retransmissions may help mitigate changes in the RF environment.

Combining Puncturing and Repetition

It may be inconvenient and inefficient to use the generally known time and frequency domain spreading of UWB. Instead, in an aspect of the design, a more efficient method of simple repetition before puncturing may be used that may achieve up to 0.6 dB of gain. In this aspect, the puncturing patterns change. Examples of the rates and repetition/puncturing patterns are provided in Table-1. Further optimization may be achieved depending upon the dB delta between classes.

TABLE 1

| Class | Rate | Encoder | Repetition | Puncturing |
|---|---|---|---|---|
| 0 | 1/12 | 1/3 | 4 | 0 |
| 1 | 1/8 | 1/3 | 3 | 1 every 9 |
| 2 | 1/5 | 1/3 | 2 | 1 every 6 |
| 3 | 1/4 | 1/3 | 2 | 2 every 6 |
| 4 | 1/3 | 1/3 | 1 | 0 |
| 5 | 1/2 | 1/3 | 1 | 1 every 3 |
| 6 | 3/4 | 1/3 | 1 | 1 every 4 |
| 7 | 1 | 1/3, or 1 | 1 | 2 every 3, or 0 |

It may be seen from Table-1 that time and frequency domain spreading has been replaced by repetition prior to puncturing. This may result in simpler puncturing and higher gains. It also may result in relatively similar puncturing patterns across the various classes, i.e., the three (3) polynomials of the encoder are nearly equally loaded, which may reduce the effect of inter-class boundary, for example, in a Viterbi decoder.

In general, a fixed convolutional encoder with rate 1/3 punctures then repeats as needed to achieve various data rates; puncturing is applied first, followed by repetition in the form of time and frequency domain spreading. However, this conventional method is sub-optimal as compared to applying repetition first and then puncturing. The improvement may affect the rates that have time and/or frequency domain spreading (i.e., repetition) as well as puncturing.

The gains that may be achieved are approximately 0.25 dB for 80 or 160 Mbps rates and approximately 0.6 dB for 200 Mbps rate. Additional gain may be obtained for the data rates of 53.3, 80, 106.7, 160 and 200 Mbps since the frequency spreading and time spreading methods are not optimal in terms of frequency diversity. Certain repeated tones are transmitted in the same region that may entirely fade. This mainly involves the tones near DC that already suffer from the DC removal filter at the receiver side.

Some of the hardware advantages of the disclosed aspects may be the following way: puncturing and repetition are simpler to implement than frequency and time spreading. In addition, puncturing and repetition may further eliminate the need for interleaver blocks such as the cyclic shift. A unique interleaver of 1200 bits may suffice, since there may be no need to support 300 and 600 Mbps, thereby simplifying the architecture. However, it should be appreciated, with the benefit of the present disclosure, that if the modes above 200 Mbps are not supported, then the device could use an interleaver of just 600 bits.

In Table-2, a comparison between current patterns and the combined puncturing/repetition patterns and an aspect of the design are illustrated. A "0" in the pattern means punctured bit and a "non 0" means a transmitted bit. The weight of the transmitted bit is its repetition level: "1" means transmitted once, "2" means transmitted twice, "3" means transmitted three times.

TABLE 2

| Rate (Mbps) | Current Puncturing Pattern | Current Repetition Rate | Current Effective Pattern | Proposed Pattern | Gain (dB) |
|---|---|---|---|---|---|
| 80 | 1 0 1 | 4 | 4 0 4 | 3 2 3 | 0.25 |
| 200 | 11000111000111 | 2 | 22000222000222 | 211111111111111 | 0.6 |

By way of explanation, for the case of 80 Mbps, the current puncturing pattern is 1 0 1, which means that the second convolutional polynomial (out of 3 for rate ⅓) is unused, which weakens the encoding. After repetition by four (4), the output of the remaining two (2) polynomials is repeated 4 times. However, the second polynomial is ignored. By performing repetition first, each output is repeated three (3) times to obtain a pattern of 3 3 3. Then the middle polynomial is punctured once to obtain a final pattern of 3 2 3. This pattern is close to the unpunctured pattern of 3 3 3 (i.e., as if no puncturing). No spreading in time and/or frequency domain is necessary after this operation. In an aspect of the design, for the rate 200 Mbps, the proposed puncturing pattern may be achieved by simply repeating 1 bit every 15 bits. Thus, this repetition/puncturing patterns tend to be simpler.

Sub-Carrier Interleaving

In an aspect of the design, some diversity may be desirable to handle a sudden interferer that appears on some adjacent sub-carriers by interleaving within one (1) or two (2) OFDM symbols. Thereby, correlated coded bits are not carried by adjacent sub-carriers. Interleaving may be done inside a class' buffer by shuffling the coded bits. Alternatively, interleaving may be performed by shuffling inside the tone mapper 222. Simple shuffling may result in some form of randomization (i.e., non-deterministic interleaving). For example, when a frame is lost, its retransmitted version may use a different shuffling pattern to avoid hitting the same weak spot twice.

Carrier Quality Classes

The adaptive loading receiver 204 measures the quality of each sub-carrier (e.g., SINR, C/I, SNR). This may be performed in various ways. For example, it may be done through the use of an existing preamble, a training sequence, a pilot signal, or data. In an aspect of the design, the receiver 204 obtains a sub-carrier's SINR and classifies it into the appropriate class. Eight (8) possible classes may be defined, from 0 to 7. The delta in SINR between classes could be 2 to 3 dB. Class 0 could mean lowest quality and class 7 could mean highest quality. A good choice of the classes depends on the coding and optimum repetition and/or puncturing patterns. The classes 1 to 6 may be delimited to a size of 2 to 3 dB. However, class 0 may be unlimited on the lower side while class 7 may be unlimited on the upper side. This means that carriers in class 0 may be exceedingly weak. Class 0 may signal "do not use these sub-carriers". Class 7, on the other hand, may contain exceedingly strong carriers.

Feedback to Transmitter

The adaptive loading receiver 204 may advantageously and efficiently use valuable OTA resources and conserve battery power while enhancing OFDM transmission by having a CSI component 248, capable of various types of CSI reports 250 in order to provide feedback to the adaptive loading transmitter 202. In an aspect of the design, this feedback may be in the form of a full CSI bitmap 252, a of change sub-carriers CSI report 254, or a specific sub-carrier CSI report 256.

With further reference to FIG. 3, in an aspect of the design, the adaptive loading receiver 204 sends a feedback message 250 with three (3) bits per carrier to the adaptive loading transmitter 202. In OFDM-based UWB, there are 100 carriers per band. Thus, 300 bits per band are needed, and 900 bits are needed for a total of three (3) bands. The feedback message 250 consists of a bitmap with three (3) bits per carrier. This message, which may be the report 254, may be sent infrequently when quality levels change. Moreover, the message 250 may be compressed. For example, this may be report 254, wherein if only a few sub-carriers are affected by a change, then a special message may convey the new classes for the few sub-carriers without resending the entire bitmap as in report 252. In addition, since contiguous sub-carriers often have similar quality levels, it may be possible to compress the bitmap by encoding in the message the deltas between classes rather than the absolute class number. Alternatively, a hierarchical approach may be used wherein, for a given interval, e.g., every ten (10) contiguous tones are first assigned to a unique class then, if needed, their individual deltas are transmitted.

In another aspect of the design, additional messages could carry specific information for specific carriers as in report 256. For example, the message "do not use sub-carrier number 80" could mean that a strong fade or a strong interferer on that sub-carrier (very weak SINR) is present.

In the event where each transmitted frame is not acknowledged by a peer unit, the feedback information may go out of synchronization between the adaptive loading transmitter 202 and receiver 204. In this situation, a simple protocol may ensure that both sides know the state of the system. The adaptive loading receiver 204 may send a transaction number and the adaptive loading transmitter 202 may embed this transaction number in a header. The transaction number in the header may inform the adaptive loading receiver 204 of the class's state. A double buffering of the classes at the adaptive loading receiver 204 may be used to process old packets before the new scheme is established.

Figure 4:
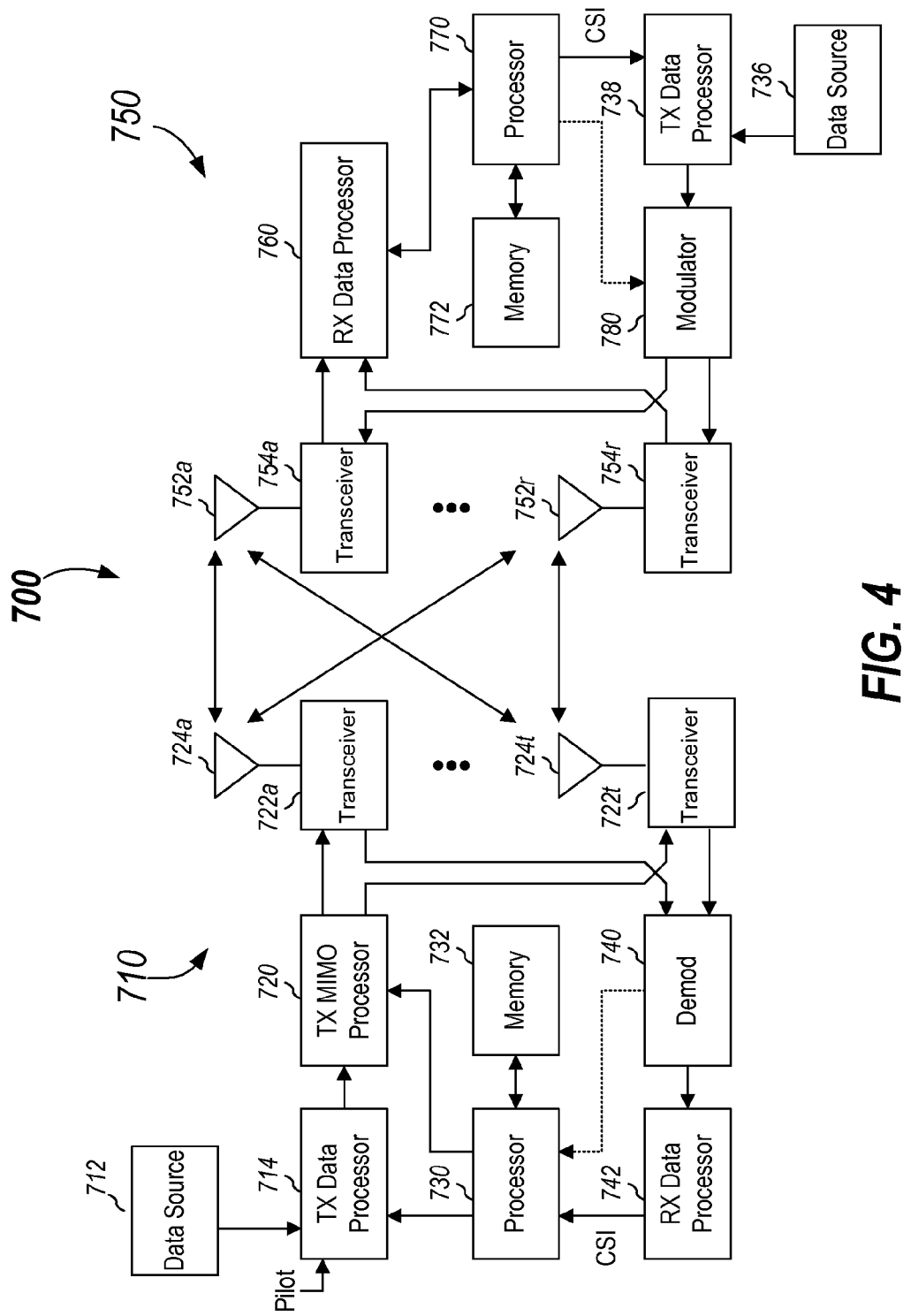
FIG. 4 illustrates a more detailed block diagram of a wireless communication system that may be used to operate the various aspects disclosed.

FIG. 4 illustrates a more detailed block diagram of a wireless communication system 700 that may be used to operate the various aspects disclosed. The communication system comprises a transmitter system 710 (also known as the access point) and a receiver system 750 (also known as access terminal). At the transmitter system 710, traffic data for a number of data streams is provided from a data source 712 to a transmit (TX) data processor 714.

In an aspect, each data stream is transmitted over respective transmit antenna. TX data processor 714 formats, codes, and interleaves the traffic data for each data stream, based on a particular coding scheme selected for that data stream to provide coded data. TX data processor 714 may comprise the encoders 108 and 208, rate adapters 112 and 217a-c, optional interleaver 114, de-multiplexer 212, and buffer 218 as described above in FIGS. 2 and 3.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped), based on a particular modulation scheme (e.g., BPSK, QSPK, M-PSK, or M-QAM) selected for that data stream to provide modulation symbols. The data rate, coding, and modulation for each data stream may be determined by instructions performed by processor 730. Processor 730 may also comprise the mapper 110b, tone mapper 222, and the class selector 214 as described above in FIGS. 2 and 3.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. The TX MIMO processor 720 may also apply beamforming. TX MIMO processor 720 may comprise the modulator 116, tone mapper 222, mapper 10b, IFFFT 118 and 224 as described above in FIGS. 2 and 3.

Each transceiver 722a-t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceiver 722a-t are then transmitted from $N_T$ antennas 724a through 724t, respectively.

At receiver system 750, the transmitted modulated signals are received by $N_R$ antennas 752a through 752r and the received signal from each antenna 752 is provided to a respective transceiver 754a through 754r. Each transceiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ transceiver 754, based on a particular receiver processing technique to provide $N_T$ "detected" symbol streams. The RX data processor 760 then demodulates, deinterleaves, and decodes each detected symbol stream to recover the traffic data for the data stream. RX data processor may comprise the de-mapper 126, the FFT 124, the demodulator 128, the deinterleaver 130, rate adapter 132, and decoder 134 and 228 as described above in FIGS. 2 and 3. The processing by RX data processor 760 is complementary to that performed by TX MIMO processor 720 and TX data processor 714 at transmitter system 710.

The RX processor 770 may comprise the CSI 248 as described above in FIG. 3. The reverse link message may comprise various types of information regarding the communication link or the received data stream. The reverse link messages may comprise the CSI reports as described above in FIGS. 2 and 3. The reverse link message is then processed by a TX data processor 738, which also receives traffic data for a number of data streams from a data source 736 and information from processor 770, is modulated by a modulator 780, is conditioned by transceivers 754a through 754r, and is transmitted back to transmitter system 710.

At transmitter system 710, the modulated signals from receiver system 750 are received by antennas 724, conditioned by transceivers 722, demodulated by a demodulator 740, and processed by a RX data processor 742 to extract the reserve link message transmitted by the receiver system 750. Memory 772 and 732 support the processors 770 and 730 respectively.

Figure 5:
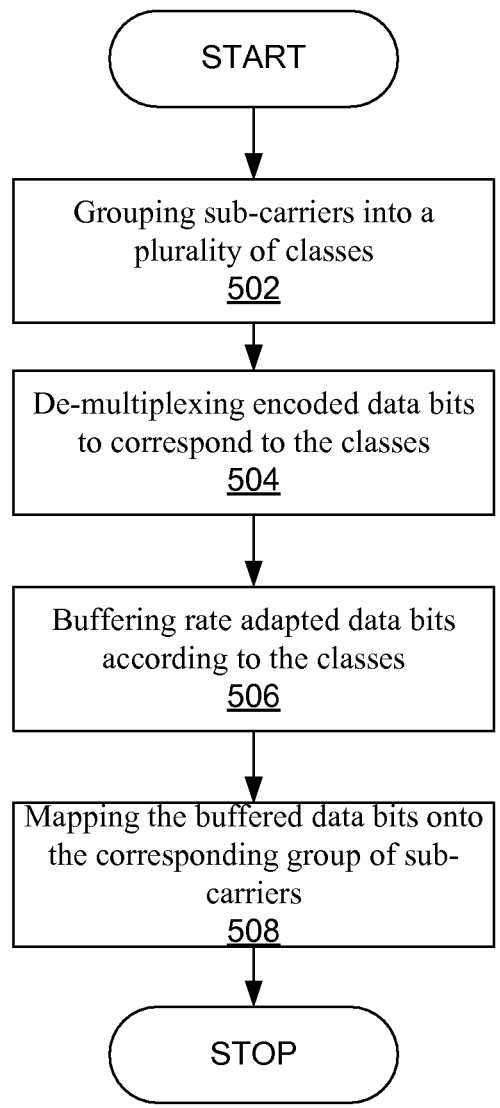
FIG. 5 illustrates a process for transmitting adaptive loaded data in an aspect of the design.

FIG. 5 illustrates a process for transmitting adaptive loaded data in an aspect of the design. First sub-carriers may be grouped according to a class 502. The classes may be categorized based on feedback. Next, encoded data bits may be de-multiplexed according to the classes 504. Each class may have an associated data rate. The de-multiplexing also may rate adapt the encoded data bits in order to have the encoded data bit's rate match those of the class' associated data rate. Optionally, the encoded data bits may also be interleaved. Then the rate adapted data bits may be buffered according to their class 506. Each class may have an associated buffer. Finally, the buffered data is mapped onto the corresponding groups of sub-carriers 508 for data transmission.

Figure 6:
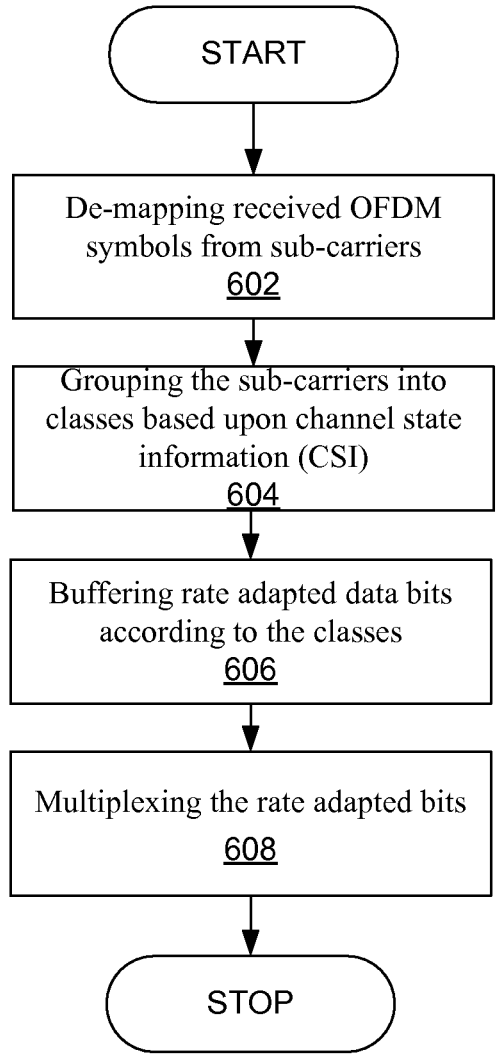
FIG. 6 illustrates a process for receiving data that was adaptive loaded in an aspect of the design.

FIG. 6 illustrates a process for receiving data that was adaptively loaded in an aspect of the design. First, OFDM symbols may be de-mapped from sub-carriers in order to produce rate adapted data bits 602. Prior to, or after, the sub-carriers may be grouped into classes based upon the channel state information 604. The de-mappped rate adapted data bits may then buffered according to their class 606. Each class has an associated buffer. Finally, the buffered rate adapted data bits are multiplexed in order to produce encoded data bits 608. The multiplexing also may perform rate adaption in order to match the class' rate to the encoded data bits rate. Optionally, the encoded data bits may also be de-interleaved.

Figure 7:
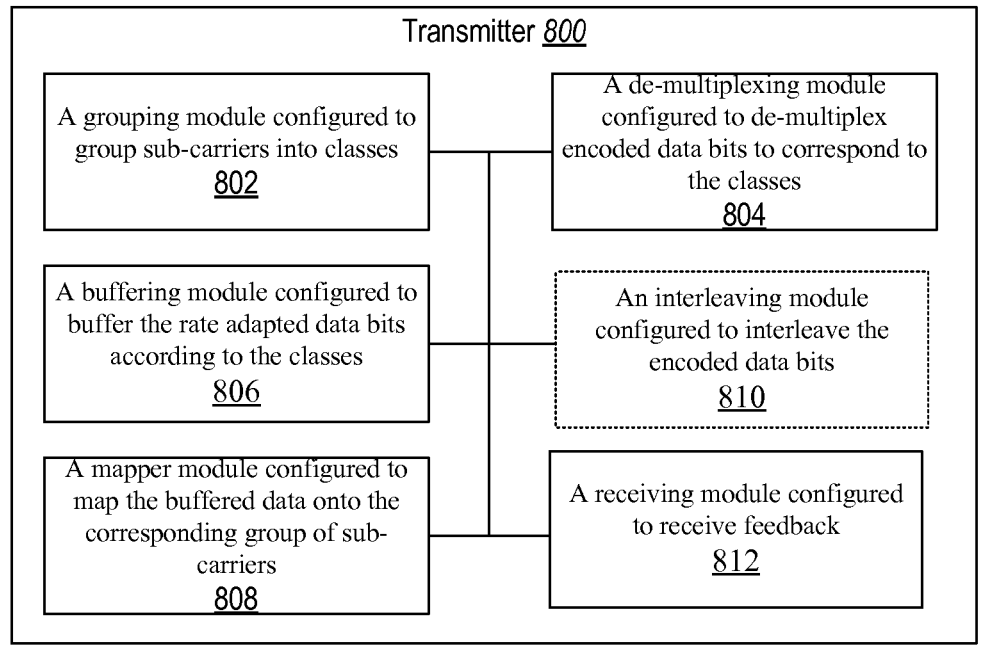
FIG. 7 illustrates an example of an apparatus that performs adaptive loading for transmission with an aspect of the design.

FIG. 7 illustrates an example of an apparatus that performs adaptive loading for transmission with an aspect of the design. Transmitter 800 may include a grouping module 802 configured to group the sub-carriers into classes. The grouping may be based upon feedback received by the receiving module 812. Transmitter 800 may include an optional interleaver 810 that may interleave some of the encoded data bits. Transmitter 800 may include a de-multiplexing module 804 that de-multiplexes encoded data bits in order to correspond to the classes by rate adapting them. Transmitter 800 may include a buffering module 806 that may buffer the rate adapted data bits to correspond to their classes. Transmitter 800 may also include a mapper module 808 that may map the buffered data onto corresponding sub-carriers.

Figure 8:
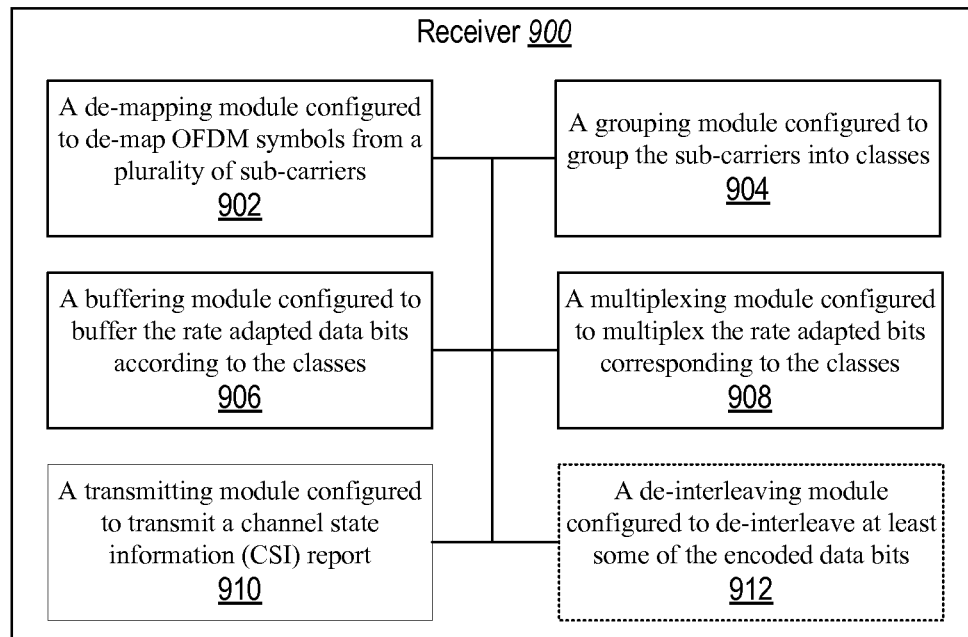
FIG. 8 illustrates an example of an apparatus that receives information transmitted by an adaptive loading transmitter with an aspect of the design.

FIG. 8 illustrates an example of an apparatus that receives information transmitted by an adaptive loading transmitter with an aspect of the design. Receiver 900 may include a de-mapping module 902 that may de-map OFDM symbols from sub-carriers. Receiver 900 may include a grouping module 904 that may group the various sub-carriers into classes. Receiver 900 may include a transmitting module 910 that can transmit channel state information (CSI). Receiver 900 may include a buffering module 906 that may buffer rate adapted data bits according to their class. Receiver 900 may also include a multiplexing module 908 that may multiplex the buffered rate adapted data bits corresponding to their class. The multiplexing module 908 may rate adapt the buffered rate adapted bits in order to produce encoded data bits. Receiver 900 can optionally include a de-interleaver module 912 for de-interleaving some of the encoded data bits.

Those skilled in the art would further appreciate that the various illustrative logical blocks, modules, and steps described in connection with the aspects disclosed herein may be implemented as hardware, software, firmware, or any combination thereof and hardware implementation may be digital, analog or both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The various illustrative logical blocks, and modules described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an integrated circuit, one or more microprocessors in conjunction with a DSP core, or any other such configuration.

An exemplary storage medium is coupled to the processor such the processor could read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The steps or functions of a method or algorithm described in connection with the aspects disclosed herein may be embodied directly in hardware, in software executed by a processor, or in a combination of the two. The steps or functions could be interchanged without departing from the scope of the aspects.

If the steps or functions are implemented in software, the steps or functions may be stored on or transmitted over as one or more instructions of code on a computer-readable medium. Computer-readable media includes both computer storage media and communication media including any media that facilitates transfer of a computer program from one place to another. A storage media may be any available media that could be assessed by a general purpose or special purpose computer. By way of example, and not limitation, such computer-readable media could comprise RAM, flash memory, ROM, EPROM, EEPROM, registers, hard disk, a removable disk, a CD-ROM, optical disk storage, magnetic disk storage, magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source, using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically. A computer program product would also indicate materials to package the CD or software medium therein. Combinations of the above should also be included within the scope of computer-readable media.

The previous description of the certain aspects is provided to enable any person skilled in the art to make or use the invention. Various modifications to these aspects will be readily apparent to those skilled in the art, and the generic principles defined herein may be applied to other aspects without departing from the scope of this disclosure. Thus, this disclosure is not intended to be limited to the aspects shown herein but is to be accorded the widest scope consistent with the principles and novel features disclosed herein.

What is claimed is:

1. A method for adaptive loading in an orthogonal frequency division multiplexing (OFDM) communication system, comprising:
    grouping sub-carriers into at least one of a plurality of classes, wherein the grouping is based upon feedback, and wherein each class has an associated data rate;
    de-multiplexing encoded data bits, sized less than an OFDM frame, to correspond to the at least one of a plurality of classes, wherein the encoded data bits are rate adapted in order to correspond to the class' associated data rate;
    buffering the rate adapted data bits according to the at least one of a plurality of classes, wherein each class has an associated buffer;
    performing inter-class boundary mitigation on the buffered rate adapted data bits by selecting one or more of the following: processing an entire class per symbol, using a highest quality class "Z" as a transition class, use a bottom class as a transition class, taking bits from another class when needed for additional transitions and collapsing the remainder into a lower class, increasing receiver (RX) CSI feedback, determining boundary classes, employing receiver (RX) feedback as to the best tones for a class prior to quantization for use at transitions, and performance back off to mitigate inter-class boundary effects; and
    mapping the buffered data onto the corresponding group of sub-carriers for data transmission.

2. The method of claim 1, further comprising interleaving at least some of the encoded data bits.

3. The method of claim 1, wherein the buffering the rate adapted data bits comprises:
    utilizing discrete buffers for each one of the associated buffers.

4. The method of claim 1, wherein the feedback is a channel state information (CSI) report.

5. The method of claim 4, wherein the channel state information (CSI) report is at least one selected from the group consisting of: full CSI bitmap, changed CSI, and specific CSI.

6. The method of claim 4, wherein the channel state information (CSI) report comprising three bits per sub-carrier.

7. The method of claim 1, wherein the at least one of a plurality of classes comprises eight classes numbered as integers zero through seven.

8. The method of claim 1, wherein the rate adaption comprises:
    performing repetition on the encoded data bits first then puncturing the result.

9. The method of claim 1, wherein the mapping comprises utilizing a dynamic look up table residing in a random access memory (RAM) or registers.

10. An apparatus for adaptive loading in an orthogonal frequency division multiplexing (OFDM) communication system, comprising:
    means for grouping sub-carriers into at least one of a plurality of classes, wherein the grouping is based upon feedback, and wherein each class has an associated data rate;
    means for de-multiplexing encoded data bits, sized less than an OFDM frame, to correspond to the at least one of a plurality of classes, wherein the encoded data bits are rate adapted in order to correspond to the class' associated data rate;
    means for buffering the rate adapted data bits according to the at least one of a plurality of classes, wherein each class has an associated buffer;
    means for performing inter-class boundary mitigation on the buffered rate adapted data bits by selecting one or more of the following: processing an entire class per symbol, using a highest quality class "Z" as a transition class, use a bottom class as a transition class, taking bits from another class when needed for additional transitions and collapsing the remainder into a lower class, increasing receiver (RX) CSI feedback, determining boundary classes, employing receiver (RX) feedback as to the best tones for a class prior to quantization for use at transitions, and performance back off to mitigate inter-class boundary effects; and
    means for mapping the buffered data onto the corresponding group of sub-carriers for data transmission.

11. The apparatus of claim 10, further comprising:
    means for interleaving at least some of the encoded data bits.

12. The apparatus of claim 10, wherein the means for buffering the rate adapted data bits comprises:
  means for utilizing discrete buffers for each one of the associated buffers.

13. The apparatus of claim 10, further comprising:
  means for receiving feedback, and wherein the feedback is a channel state information (CSI) report.

14. The apparatus of claim 13, wherein the channel state information (CSI) report is at least one selected from the group consisting of: full CSI bitmap, changed CSI, and specific CSI.

15. The apparatus of claim 13, wherein the channel state information (CSI) report comprising three bits per sub-carrier.

16. The apparatus of claim 10, wherein the at least one of a plurality of classes comprises eight classes numbered as integers zero through seven.

17. The apparatus of claim 10, wherein the rate adaption comprises:
  means for performing repetition on the encoded data bits first then puncturing the result.

18. An apparatus for adaptive loading in an orthogonal frequency division multiplexing (OFDM) communication system, comprising:
  a grouping module configured to group sub-carriers into at least one of a plurality of classes, wherein the grouping is based upon feedback, and wherein each class has an associated data rate;
  a de-multiplexing module configured to de-multiplex encoded data bits, sized less than one OFDM frame, to correspond to the at least one of a plurality of classes, wherein the encoded data bits are rate adapted in order to correspond to the class' associated data rate;
  a buffering module configured to buffer the rate adapted data bits according to the at least one of a plurality of classes, wherein each class has an associated buffer;
  the buffering module configured to perform inter-class boundary mitigation on the buffered rate adapted data bits by selecting one or more of the following: processing an entire class per symbol, using a highest quality class "Z" as a transition class, use a bottom class as a transition class, taking bits from another class when needed for additional transitions and collapsing the remainder into a lower class, increasing receiver (RX) CSI feedback, determining boundary classes, employing receiver (RX) feedback as to the best tones for a class prior to quantization for use at transitions, and performance back off to mitigate inter-class boundary effects; and
  a mapper module configured to map the buffered data onto the corresponding group of sub-carriers for data transmission.

19. The apparatus of claim 18, further comprising:
  an interleaving module configured to interleave at least some of the encoded data bits.

20. The apparatus of claim 18, further comprising:
  a receiving module configured to receive feedback, and wherein the feedback is a channel state information (CSI) report.

21. The apparatus of claim 18, wherein the at least one of a plurality of classes comprises eight classes numbered as integers zero through seven.

22. The apparatus of claim 18, wherein the de-multiplexing module is further configured to perform repetition on the encoded data bits first then puncture the result.

23. A computer program product comprising a non-transitory computer-readable storage device comprising:
  code for causing a computer to group sub-carriers into at least one of a plurality of classes, wherein the grouping is based upon feedback, and wherein each class has an associated data rate;
  code for causing a computer to de-multiplex encoded data bits, sized less than one orthogonal frequency division multiplexing (OFDM) frame, to correspond to the at least one of a plurality of classes, wherein the encoded data bits are rate adapted in order to correspond to the class' associated data rate;
  code for causing a computer to buffer the rate adapted data bits according to the at least one of a plurality of classes, wherein each class has an associated buffer;
  code for causing a computer to perform inter-class boundary mitigation on the buffered rate adapted data bits by selecting one or more of the following: processing an entire class per symbol, using a highest quality class "Z" as a transition class, use a bottom class as a transition class, taking bits from another class when needed for additional transitions and collapsing the remainder into a lower class, increasing receiver (RX) CSI feedback, determining boundary classes, employing receiver (RX) feedback as to the best tones for a class prior to quantization for use at transitions, and performance back off to mitigate inter-class boundary effects; and
  code for causing a computer to map the buffered data onto the corresponding group of sub-carriers for data transmission.

24. An integrated circuit for adaptive loading in an orthogonal frequency division multiplexing (OFDM) communication system, comprising:
  a processor;
  a memory in electronic communication with the processor, the memory storing computer executable instructions, that when executed by the processor, cause the processor to:
    group sub-carriers into at least one of a plurality of classes, wherein the grouping is based upon feedback, and wherein each class has an associated data rate, to receive feedback;
    de-multiplex encoded data bits, sized less than one OFDM frame, to correspond to the at least one of a plurality of classes, wherein the encoded data bits are rate adapted in order to correspond to the class' associated data rate;
    buffer the rate adapted data bits according to the at least one of a plurality of classes, wherein each class has an associated buffer;
    perform inter-class boundary mitigation on the buffered rate adapted data bits by selecting one or more of the following: processing an entire class per symbol, using a highest quality class "Z" as a transition class, use a bottom class as a transition class, taking bits from another class when needed for additional transitions and collapsing the remainder into a lower class, increasing receiver (RX) CSI feedback, determining boundary classes, employing receiver (RX) feedback as to the best tones for a class prior to quantization for use at transitions, and performance back off to mitigate inter-class boundary effects; and
    map the buffered data onto the corresponding group of sub-carriers for data transmission.

* * * * *